United States Patent [19]

Hamasaki

[11] Patent Number: 4,773,389

[45] Date of Patent: Sep. 27, 1988

[54] SELF-HEATING FOODSTUFF CONTAINER

[75] Inventor: Masafumi Hamasaki, Tokorozawa, Japan

[73] Assignees: Chori Company, Ltd., Osaka; Fukubi Kagaku Kogyo Kabushiki Kaisha, Fukui; Hama Corporation Co., Ltd., Saitama, all of Japan

[21] Appl. No.: 11,915

[22] Filed: Feb. 5, 1987

[51] Int. Cl.[4] .................................................. F24J 1/00
[52] U.S. Cl. ................................... 126/263; 126/262; 220/DIG. 10; 220/20; 62/4
[58] Field of Search ................ 126/263, 262; 220/DIG. 10, 20; 62/4, 294

[56] References Cited

U.S. PATENT DOCUMENTS

| | | | |
|---|---|---|---|
| 3,561,424 | 2/1971 | Foilla | 126/263 |
| 3,685,507 | 8/1972 | Donnelly | 126/263 |
| 3,889,483 | 6/1975 | Donnelly | 126/263 |
| 3,970,068 | 7/1976 | Sato | 126/263 |
| 4,528,218 | 7/1985 | Maione | 126/263 |
| 4,640,264 | 2/1967 | Yamaguchi et al. | 126/263 |

Primary Examiner—Larry Jones
Attorney, Agent, or Firm—Wenderoth, Lind & Ponack

[57] ABSTRACT

A self-heating foodstuff container is capable of generating heat by utilizing an exothermic reaction and includes a body having a first chamber for containing a foodstuff and a second chamber for receiving an exothermic reaction agent, and a liquid container including a body portion and a conduit connected to the body portion for discharging the liquid into the second chamber. The body portion is disposed outside of the second chamber and is capable of contracting upon pressure. The container further includes a support member carrying the body portion and slidably mounted with respect to the body in such a manner that the sliding movement of the support member presses the body portion and causes the liquid to discharge through the conduit into the second chamber for initiating the exothermic reaction.

22 Claims, 6 Drawing Sheets

SELF-HEATING FOODSTUFF CONTAINER

BACKGROUND OF THE INVENTION

The present invention relates to a foodstuff container and, more particularly, to a container using an exothermic reaction agent for heating the contained foodstuff such as Japanese Sake, coffee, soup, noodles and the like, without the supply of external thermal energy.

It is known to warm the foodstuff by utilizing heat generated by a chemical exothermic reaction such as hydration between quick lime (calcium oxide) and water as disclosed in, for example, U.S. Pat. No. 2,288,895, U.S. Pat. No. 3,369,369, Japanese Utility Model Publication No. 57-2867, Japanese Utility Model Applications as laid open under No. 59-101882, No. 59-162826, No. 59-162828, No. 59-171629 and No. 60-70235. In any of these prior art references, the reaction agent is incorporated in a container body. When it is desired to initiate the exothermic reaction, the reaction inducing liquid is mixed with the agent either by supplying the liquid from outside the container body, as typically disclosed in Japanese Utility Model laid open under No. 59-101882, or by rupturing a liquid bag incorporated in the container body by means of a needle member, as typically disclosed in Japanese Utility Model laid open under No. 60-70235. The self-heating container of the latter type has eliminated the inconvenience of carrying a water bottle, for example, in addition to the container itself.

However, the self-heating container of the above type has the following problems. That is, the exothermic reaction, particularly the hydration between the quick lime and water is very active and is initiated immediately after the quick lime is mixed with the water, with resultant generation of expanded hot gases including steam. If the water of a quantity necessary for causing the reaction with all of the quick lime contained is supplied at once, there is very rapidly generated a large amount of hot gases, a part of which sometimes spouts from the container body with non-reacted water. This not only involves a danger to the body and clothes of the user but also decreases efficiency due to a shortage of the quantity of water required for the contained amount of quick lime. The above prior art arrangement is never free from these disadvantages because all of the liquid is supplied to the quick lime at a moment that the bag is manually ruptured.

Further, the self-heating containers of the above prior art arrangement are designed to generate substantially a constant quantity of thermal energy. Therefore, the temperature of the heated foodstuff depends on the initial temperature of the foodstuff which, in turn, depends on the ambient temperature. For instance, presuming that the contents, i.e. the foodstuff, can be suitably taken at temperature of around 40° C. to 45° C., and if the container is so designed that the contents can be heated to such temperature when used in an ambient temperature of 0° C. to 5° C., the contents would be excessively heated up to 65° C. when the container is used in an ambient temperature of around 25° C. On the other hand, if the container is designed so as to raise the temperature of the contents by about 20° C. to 25° C., the contents could be heated only to at most 30° C. when the container is used in an ambient temperature of 0° C. to 5° C.

The above problems could be removed by providing several kinds of containers each having a different volume of the exothermic reaction agent and/or liquid for use in different ambient temperatures. This, however, would increase the amount of manufacturing required with resultant increased cost and would cause users difficulty in selecting the products.

It is therefore an object of the present invention to provide a self-heating foodstuff container which may prevent hot gases from spouting out of the container to thereby avoid the above difficulties for a user.

It is another object of the invention to provide a self-heating foodstuff container in which the quantity of thermal energy to be generated can be adjusted by a simple operation in order to adjust the temperature of the foodstuff.

A further object of the invention is to provide a self-heating foodstuff container in which a user may easily and securely supply a reaction inducing liquid to an exothermic reaction agent.

A still further object of the invention is the provision of a self-heating foodstuff container which conveniently may be used anywhere without the necessity of providing separate devices such as a liquid bottle.

SUMMARY OF THE INVENTION

According to the present invention, a self-heating foodstuff container generally comprises a body, a liquid container and a support member. The body has formed therein a first chamber for containing a foodstuff and a second chamber for receiving an exothermic reaction agent. The liquid container includes a body portion which is capable of contracting upon the application thereto pressure to thereby reduce the volume thereof and is disposed outside of the second chamber, and a conduit connected to the body portion and extending into the second chamber to terminate in an open end. The support member carries the body portion of the liquid container and is slidably mounted with respect to the body, whereby sliding movement of the support member presses the body portion and causes the liquid to discharge through the conduit into the second chamber to initiate the exothermic reaction.

The body may include a side wall and a bottom wall having an upwardly embossed portion, and the first chamber may be defined by the side wall outside of the embossed portion while the second chamber is defined within the embossed portion.

In an embodiment of the invention, the body portion of the liquid container is formed of a flexible material. Preferably, the body portion has a substantially cylindrical shape and includes a pleated side wall capable of elastically contracting upon the application thereto of pressure.

A plug may be fitted in the open end of the conduit to close the open end, the plug being removable by liquid pressure when the body portion is contracted. Preferably, a press rod extends in the liquid container and has a lower end positioned in the vicinity of the lower wall of the body portion and an upper end for pressing the plug when the press rod is moved upwardly by the contraction of the body portion.

A supplemental liquid container may be disposed in the second chamber and surrounded by the exothermic reaction agent. The supplemental container is formed of a material capable of being melted by heat generated by the exothermic reaction, whereby an initial exothermic reaction caused by the liquid from the open end melts the supplemental container for supplying further liquid to continue the reaction.

In one embodiment of the invention, the conduit of the liquid container includes formed in a longitudinally intermediate portion thereof an expanded part for containing the liquid. The expanded part is capable of being melted by heat generated by the exothermic reaction, whereby an initial exothermic reaction caused by the liquid from the open end melts the expanded part for supplying further liquid to continue the reaction.

Further, according to the invention, a self-heating foodstuff container comprises a body having defined therein a first chamber for containing a foodstuff and a second chamber for receiving an exothermic reaction agent, and a liquid container including a lower part disposed outside of the second chamber, an upper part positioned within the second chamber and having an open end for discharging the liquid into the second chamber, and a conduit connecting the lower and upper parts together. The lower part is adapted to contract upon the application thereto of pressure with the volume thereof being reduced and to recover to the normal volume thereof upon removal of the pressure, while the upper part is formed of a material capable of being melted by heat generated by the exothermic reaction, whereby the volume of the liquid supplied for causing the exothermic reaction is adjustable by the lower part, to thereby adjust the amount thermal energy to be generated.

Other objects, features and advantages of the invention will be apparent from the following detailed description thereof when taken in conjunction with the accompanying drawings.

DETAILED DESCRIPTION OF THE INVENTION

Figure 1:
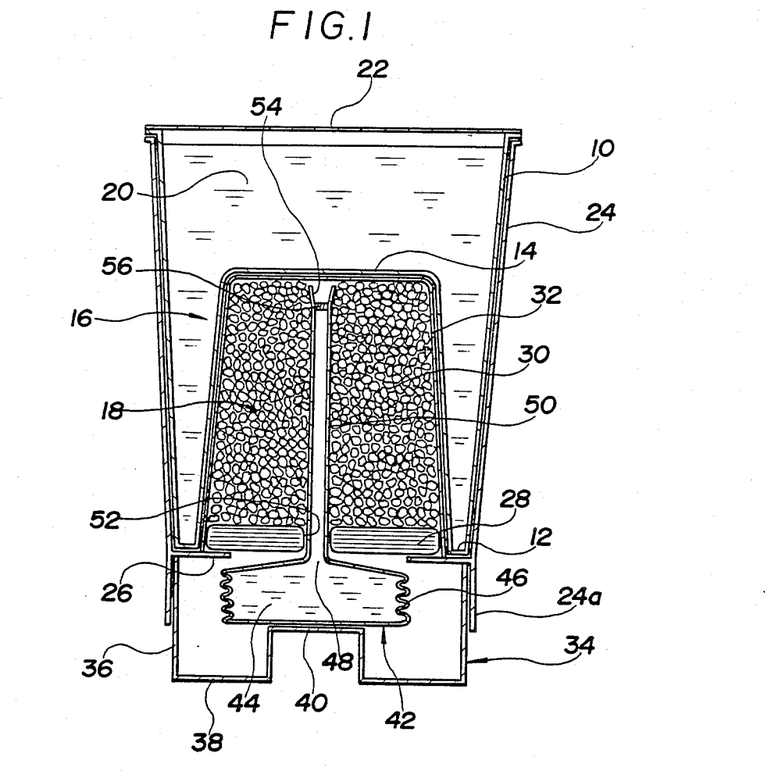
FIG. 1 is a longitudinally sectioned view illustrating a self-heating foodstuff container according to an embodiment of the invention.

Referring now to FIG. 1 of the drawings, a self-heating container according to an embodiment of the present invention includes a hollow, substantially cylindrical body 10 which may be formed of a synthetic resin material, alminum or other metal material. The body 10 has an upper open end and a bottom wall 12 having a central portion 14 embossed toward the upper end, and thus defining a first chamber 16 outside of the embossed wall and a second chamber 18 inside thereof. The first chamber 16 is, after being filled with desired food or beverage 20, closed by a lid 22 having, not illustrated in the drawing, means for easy opening of any conventional structure.

Fitted over the wall of the body 10 is a heat insulative cover 24 made of paper or foamed synthetic resin and having a lower vertical portion 24a which extends beyond the bottom wall 12 of the body 10 to define a cylindrical open space. The portion 24a is provided, at a position just below the bottom wall 12, with an inwardly extending annular flange 26 to support thereon a closure member 28 for the second chamber 18. This chamber 18, is before being closed by the member 28, filled with an exothermic reaction agent 30 which, in this embodiment, comprises quick lime capable of generating heat when mixed with water. A protective metal layer 32 may be adhered to the inner surface of the embossed portion 14, particularly if the body 10, and therefore the portion 14, are made of synthetic resin. If desired, a liquid absorbent material can be disposed either between the agent 30 and the closure 28 or within the closure 28 so that any leakage of water may be prevented.

A dish-shaped support 34 having a vertical side wall 36 is detachably fitted in the vertical portion 24a of the cover 24 with an upper end of the side wall 36 normally being in contact with the lower surface of the flange 26. A bottom wall 38 of the support 34 is provided at a center part thereof with an upwardly extending projection 40 having a flat top end to support a liquid container 42 thereon. This container 42 is formed of flexible material, for example polyethylene, into a substantially cylindrical shape and is so constructed that when pressed it may deform or contract in order to discharge a liquid, i.e. water 44 in this embodiment, contained therein. For this purpose, the container 42 has a side wall 46 which is pleated in a bellows-like manner. Alternatively, the container 42 may be formed of elastic material which permits contraction of the container when it is pressed. The container 42 is seated on the projection 40 of the support 34 and is disposed between the closure member 28 and the support 34, that is, disposed outside of the second chamber 18. The bottom of container 42 is normally located at a level slightly above the lower edge of the vertical portion 24a.

Figure 2:
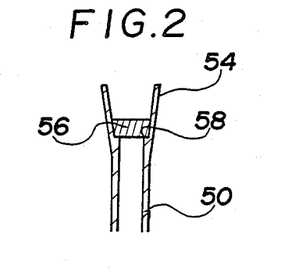
FIG. 2 is an enlarged sectional view showing an open end of a liquid container in FIG. 1.

The container 42 is integrally connected by an opening 48 in the upper wall thereof with a conduit 50 which extends into the second chamber 18 through an aperture 52 formed in the center of the closure member 28. An upper end 54 of the conduit 50 is opened to the chamber 18 at a substantially uppermost portion thereof so that the water discharged from the end 54 may flow down the chamber 18. The end 54 is normally closed by a plug 56 tightly fitted therein. The plug 56 can be made of any desired material such as plastics, wood or metal but it is preferably made of elastic and viscous material such as clay, diatomite, natural or synthetic rubber, wheat flour, starch, water glass, butter or compositions thereof. As illustrated in FIG. 2, the upper end 54 is funnel-shaped and has a shoulder portion 58 on which the plug 56 rests. This arrangement ensures that the plug 56 is removed with a small water pressure and that a passage for the water is provided once the plug 56 is raised, while facilitating the insertion of the plug during assembly.

Figure 3:
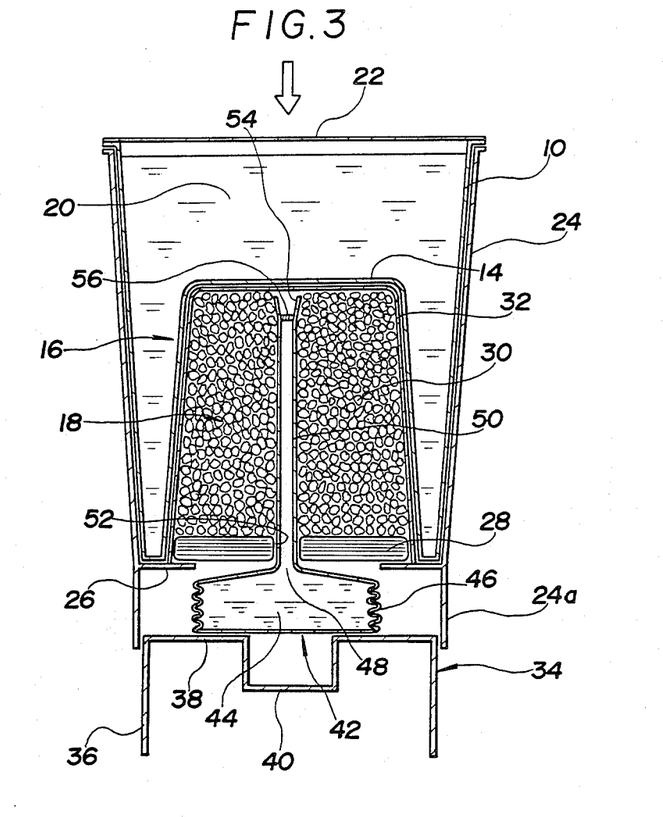
FIG. 3 is a view similar to FIG. 1 with a support member in an operative position.

In FIG. 1, the whole assembly is illustrated in a preserved portion with the support 34 being fitted in the portion 24a of the cover 24. When it is desired to heat the contents 20, the support 34 is pulled out of the portion 24a and is placed on a stationary member such as table in an upside down state, that is, with the bottom wall 38 forming an upper surface as shown in FIG. 3. After the wall 38 is fitted in the portion 24a so that the bottom of the liquid container 42 rests on the wall 38, the body 10 as well as the cover 24 is pressed downwardly to thereby cause the container 42 to contract due to the pleated side wall wall 46 folding. The water 44 is therefore forced to flow up the conduit 50 and the plug 56 is removed from or raised in the open end 54 by the pressure of the water to permit the water to discharge into the second chamber 18. A hydration reaction between the discharged water and the quick lime 30 then follows to generate thermal energy which, through the layer 32 and the wall 14, is transmitted to the first chamber 16 in order to heat the contents 20.

The quantity of the thermal energy to be generated depends on the degree of the hydration reaction which, in turn, depends on the volume of water to be supplied to the quick lime 30. Accordingly, if it is not desired to generate maximum energy, for example in view of an atmospheric temperature to which the whole assembly is subjected, the support 34 is moved upward relative to the portion 24a to an extent where a predetermined volume of water is discharged into the second chamber 18. This may easily be achieved by putting indication marks on the side wall 36 of the support 34.

The present inventor conducted the following experiments in order to determine the relation between the volume of water and the heat energy. First, four samples were prepared in accordance with the design of FIG. 1, the liquid containers 42 being filled with 25 cc of water and the second chambers with 65 g of quick lime. Two of the four samples were subjected to an ambient temperature of 4.0° C. for about two hours and then 25 cc of water was discharged into the chambers 18 by fully pressing the supports 34. As a result, the contents 20 were heated to 44.5° C. and 44.9° C. after five minutes and 46.4° C. and 46.8° C. after seven minutes, respectively. The other two samples were left in a room at 24.2° C. for about an hour prior to the hydration reaction. Each support 34 was pressed until the lower edge of the portion 24a was aligned with a mark on the side wall 36, so that only 15 cc of the water was supplied to the chamber 18. Temperatures of the contents 20 were 42.1° C. and 42.6° C. after four minutes, and 47° C. and 47.6° C. after seven minutes. It was thus confirmed that the heat energy to be generated could be adjusted by the degree of movement of the support 34.

In the above experiments, when the supports 34 were so pressed that all of the 25 cc or 15 cc of water was discharged at once, heated gases spouted out of the assembly together with a leakage of non-reacted water. However, these problems were solved by pressing the support 34 slowly and gradually, or by discharging 7 to 8 cc of water two or three times at intervals of 10 to 20 seconds. For the convenience of the latter operation several indication marks may be put on the side wall 36.

Figures 4, 6:
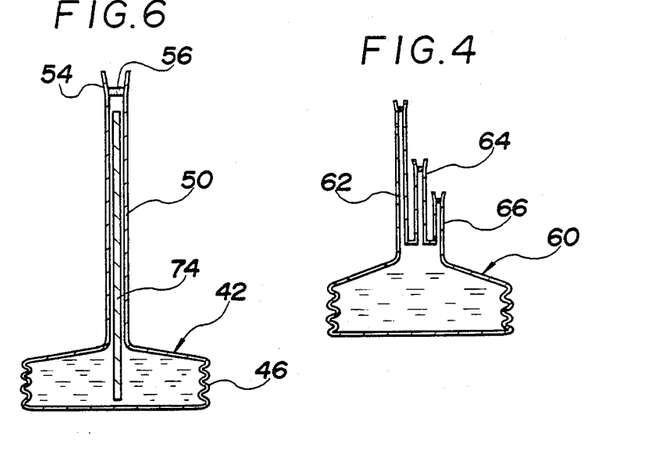
FIG. 4 is a sectional view of a modified form of the liquid container.
FIG. 6 is a sectional view of the liquid container having a press rod.
Figure 5:
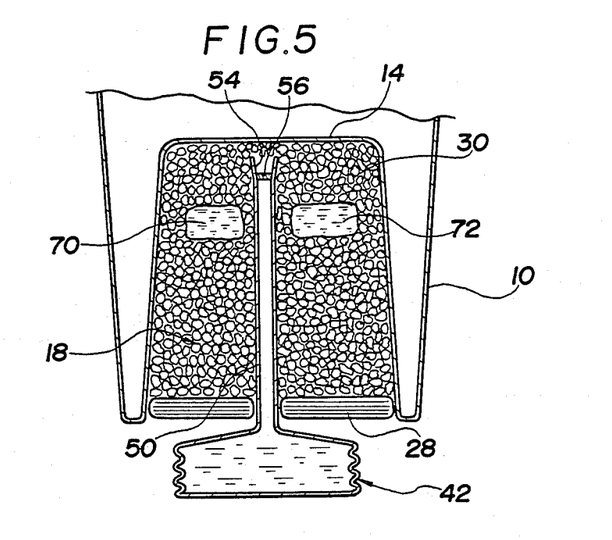
FIG. 5 is a fragmentary sectional view showing another modification of the liquid container.

In a modification shown in FIG. 4, a liquid container 60 has plural conduits 62, 64 and 66 having different lengths, respectively, so that the water from their open ends may be distributed to different areas of the second chamber 18. This arrangement is advantageous in order to avoid an excessive and too rapid hydration reaction. In another modification of FIG. 5, there are provided a pair of supplemental liquid containers 70 and 72 disposed within the second chamber 28 at opposite sides of an intermediate part of conduit 50. These containers 70 and 72 are formed of thin film material capable of melting at a relatively low temperature, so that an initial reaction caused by the water from the conduit 50 will melt them to discharge additional water contained therein and bring on a secondary reaction. In this case, the volume of the primary container 42 should be reduced for balancing the total volume of water.

As described above, the plug 56 may be removed by the water flowing up the conduit 50. If desired, however, a press rod 74 is provided in the conduit with its lower end being positioned in the vicinity of the bottom of liquid container 42, as illustrated in FIG. 6. When a pressure moves the container bottom upwardly by folding the side wall 46, the rod 74 is elevated in the conduit 50 to press the plug 56 upwardly. Therefore, the plug can be removed from the open end 54 without fail even when the engagement therebetween is considerably tight.

Figure 7:
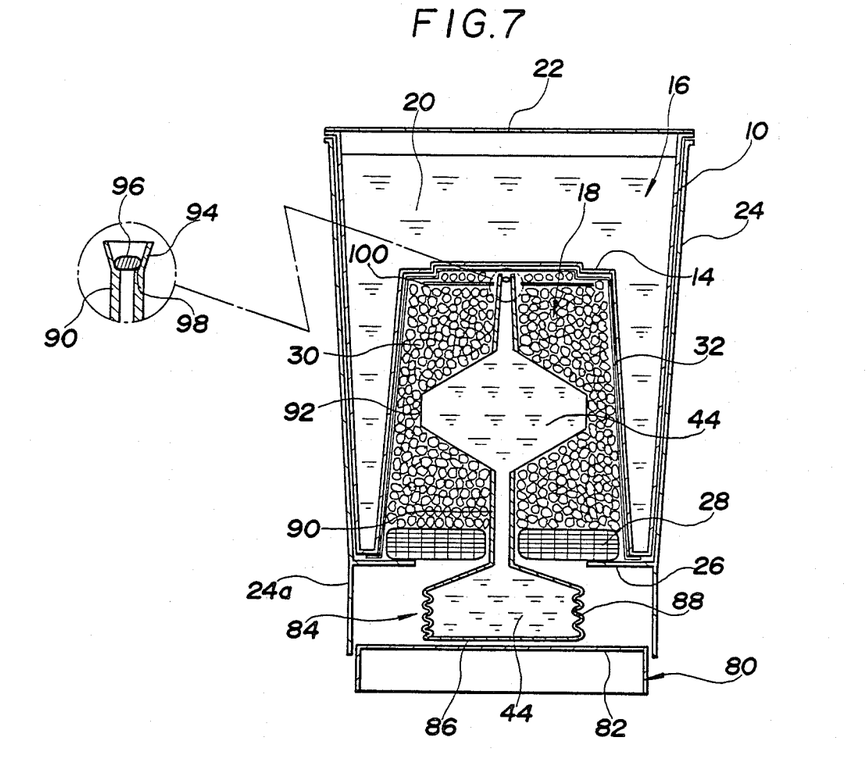
FIG. 7 is a longitudinal section of a self-heating foodstuff container according to another embodiment of the invention, with an open end of a liquid container being indicated in an enlarged scale.

FIG. 7 illustrates another embodiment of the self-heating container of the invention, in which parts the same as or corresponding to those in the embodiment of FIG. 1 are indicated by the same reference numerals. In this embodiment, a cylindrical support 80 is slidably fitted in the portion 24a of the cover 24 and has a flat upper wall 82 on which a liquid container 84 is supported. The container 84 includes a lower part 86 resting on the support 80 and having a pleated side wall 88 which is capable of folding upon application of upward pressure, as in the embodiment of FIG. 1. A conduit 90 of the container 84 extends into the second chamber 18 and is provided at a longitudinally middle section thereof with an expanded portion constituting an upper part 92, both of the parts 86 and 92 being filled with water 44. A portion of the conduit 90 above the part 92 is tapered toward an upper open end 94 which is funnel-shaped and has a shoulder 98 for a plug 96. The container 84 is formed of synthetic resin material such as polyethylene, and the wall of upper part 92 is sufficiently thin so that it will be melted by heat generated by a hydration reaction.

Arranged within the quick lime 30 is a distributing disk 100 which is positioned slightly below the open end 94 and has a plurality of apertures (not shown) for diffusing or spreading the water from the end 94 even to the peripheral portions of the second chamber 18.

When it is desired to heat the contents 20, the bottom of support 80 simply is pressed upwardly relative to the portion 24a to thereby contract the lower part 86. This causes the water therein to flow out into the upper part 92 through the conduit 90, increasing the water pressure applied to the plug 96. Thus, the plug 96 is at least raised from the shoulder 98 to permit the water to be discharged into the second chamber 18 where an initial hydration reaction starts to generate heat.

During such a reaction, the temperature in the second chamber 18 as well as the first chamber 16 is increased. When the temperature of the second chamber 18 reaches a level higher than a melting point of the wall of upper part 92, the latter is melted or ruptured to supply the water which causes a subsequent hydration reaction. As discussed above, this operation advantageously prevents expanded gases from spouting out of the assembly.

If a user desires to adjust the quantity of the thermal energy to be generated, this can be achieved by removing the pressure applied to the support 80 immediately after the lower part 86 is contracted for initiating the reaction. The lower part 86 then recovers its normal shape due to the flexiblity of the pleated wall 88, and the water flows down from the upper part 92 into the lower part 86. Therefore, the volume of water remaining in the upper part 92 is reduced, which means that the subsequent reaction will generate less heat energy. Further adjustments may be made by holding the support 80 in any desired degree of contraction between the lowermost position whereat the container lower part 86 takes its normal shape and the uppermost position whereat the part 86 is fully contracted.

The above functions will be further described with reference to following test results. Thus, the present inventor prepared four samples each having the general design of FIG. 7, the lower and upper parts 86, 92 being filled with 8 cc and 17 cc of water, respectively, and the second chamber with 65 g of the quick lime. Two of the four samples were subjected to an ambient temperature of 2.4° C. for about one and a half hours, and then each support 80 was upwardly displaced by the full extent and was held at such position so that substantially all of the 25 cc of water was used for the reaction. Temperatures of the contents 20 measured after five minutes were 42.5° C. and 43.0° C., which rose respectively to 44.5° C. and 45.2° C. in two minutes. The other two samples were placed in a room at 21.8° C. for about an hour before the reaction was initiated. Pressure was applied to the support 80 in order to contract the container lower part 86 by the full extent and was immediately removed, a part of the water returning to the part 86. The contents 20 were heated to 41.5° C. and 42.7° C. after four minutes, and 44.0° C. and 45.3° C. after seven minutes, respectively.

Figure 8:
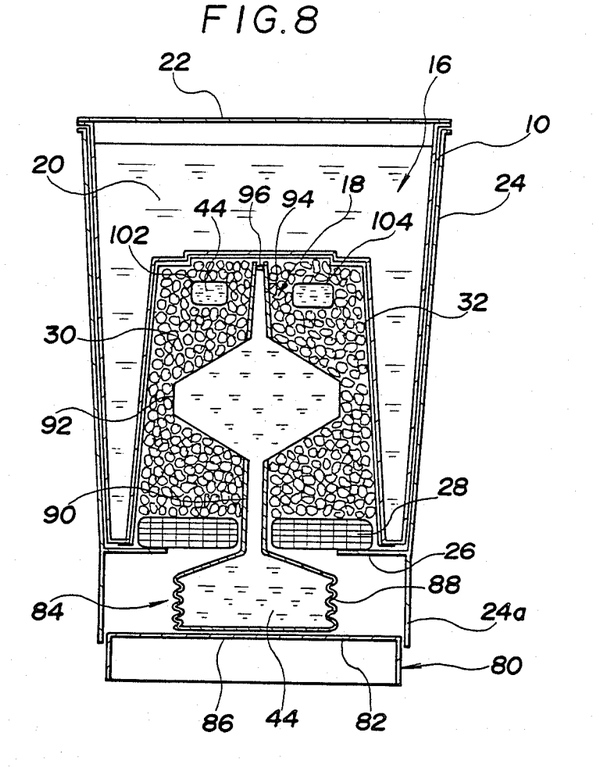
FIG. 8 is a longitudinal section showing a modification of the container of FIG. 7.

A modification shown in FIG. 8 has a pair of supplemental liquid containers 102, 104 disposed in the second chamber 18 at positions slightly below the open end 94 and spaced from the conduit 90 toward the periphery of the chamber 18. These supplemental containers are intended to be melted by the initial hydration reaction before the upper part 92 is ruptured, so that the water can be smoothly distributed even to the peripheral portion of the chamber 18. Thus, in this modification, the distributing disk 100 used in FIG. 7 may be omitted.

Figure 9:
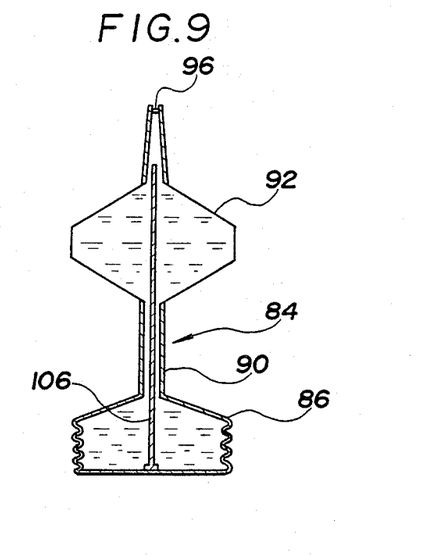
FIG. 9 is a sectional view showing a press rod incorporated into a liquid container in FIGS. 7 and 8.

FIG. 9 illustrates another example of the liquid container 84 incorporating a press rod 106 which extends upwardly from the bottom of lower part 86 and through the conduit 90 and upper part 92. As discussed with reference to FIG. 6, when the bottom of lower part 86 moves upwardly, the top end of rod 106 presses the plug 96 to remove it from the open end 94.

As will be understood from the foregoing description, the self-heating container of the invention makes it possible to adjust by a simple operation the quantity of the thermal energy to be generated. Therefore, a user can heat the contents to a desired temperature regardless of the atmospheric temperature. Further, expanded gases can be prevented from spouting out by gradually supplying the liquid to the reaction agent.

Although the invention has been described with reference to preferred embodiments thereof, many modifications and alterations may be made within the spirit of the invention.

What is claimed is:

1. A self-heating foodstuff container comprising:
    a body having formed therein a first chamber for containing a foodstuff and a second chamber for receiving an exothermic reaction agent;
    a liquid container including a body portion and a conduit connected to said body portion, said body portion being capable of contracting upon the application thereto of pressure to thereby reduce the volume thereof and being disposed outside of and separated from said second chamber, and said conduit extending into said second chamber and having an open end;
    a support member carrying said body portion of said liquid container and slidably mounted with respect to said body, whereby sliding movement of said support member relative to said body presses and contracts said body portion and causes the liquid to discharge through said conduit into said second chamber for initiating the exothermic reaction; and
    said body portion including means for enabling adjustment of the amount of the liquid to be discharged into said second chamber to thereby control the amount of thermal energy to be generated by the exothermic reaction.

2. A self-heating foodstuff container as claimed in claim 1, wherein said body includes a side wall and a bottom wall having an upwardly embossed portion, said first chamber being defined by said side wall outside of said embossed portion, and said second chamber being defined within said embossed portion.

3. A self-heating foodstuff container as claimed in claim 2, further comprising a closure member fitted in said embossed portion to close said second chamber, said closure member having formed at a substantially central portion thereof an aperture through which said conduit extends into said second chamber.

4. A self-heating foodstuff container as claimed in claim 2, further comprising a heat insulative cover fitted over said side wall of said body and having a lower extension, said support being slidably fitted in said lower extension.

5. A self-heating foodstuff container as claimed in claim 1, wherein said body portion of said liquid container is formed of a flexible material.

6. A self-heating foodstuff container as claimed in claim 5, wherein said body portion has a substantially cylindrical shape and includes a pleated side wall constituting said adjustment enabling means and capable of elastically contracting upon the application thereto of pressure and of recovering to a normal volume upon removal of the pressure.

7. A self-heating foodstuff container as claimed in claim 1, further comprising a plug fitted in said open end of said conduit to close said open end, said plug being removable by pressure of the liquid when said body portion is contracted.

8. A self-heating foodstuff container as claimed in claim 7, wherein said open end is funnel-shaped and includes a shoulder at the bottom thereof, said plug being placed on said shoulder and upwardly displaceable in said funnel-shaped open end by the liquid pressure to permit the liquid to discharge into said second chamber.

9. A self-heating foodstuff container as claimed in claim 7, further comprising a press rod extending in said liquid container, said press rod having a lower end positioned in the vicinity of the lower wall of said body portion and an upper end for pressing said plug when said press rod is moved relatively upward by the contraction of said body portion.

10. A self-heating foodstuff container as claimed in claim 1, further comprising a supplemental liquid container disposed in said second chamber and surrounded by said exothermic reaction agent, said supplemental liquid container being formed of a material capable of being melted by heat generated by the exothermic reaction, whereby an initial exothermic reaction caused by the liquid from said open end melts said supplemental liquid container for supplying further liquid to continue the reaction.

11. A self-heating foodstuff container as claimed in claim 1, wherein said conduit of said liquid container includes formed in a longitudinally intermediate portion thereof an expanded part for containing the liquid, said expanded part being capable of being melted by heat generated by the exothermic reaction, whereby an initial exothermic reaction caused by the liquid from said open end melts said expanded part for supplying further liquid to continue the reaction.

12. A self-heating foodstuff container as claimed in claim 1, wherein said exothermic reaction agent comprises quick lime and said liquid container is filled with water.

13. A self-heating foodstuff container as claimed in claim 1, wherein said liquid container includes a plurality of said conduits having different lengths.

14. A self-heating foodstuff container comprising:
a body having defined therein a first chamber for containing a foodstuff and a second chamber for receiving an exothermic reaction agent; and
a liquid container including a lower part disposed outside of and separated from said second chamber, an upper part positioned with said second chamber and having an open end for discharging the liquid into said second chamber, and a conduit connecting said lower and upper parts together, said lower part being capable of contracting upon the application thereto of pressure thus reducing the volume thereof and of recovering to a normal volume upon removal of the pressure, said upper part being formed of a material capable of being melted by heat generated by the exothermic reaction, whereby the volume of the liquid supplied for causing the exothermic reaction is adjustable by said lower part to thereby control the amount of thermal energy to be generated.

15. A self-heating foodstuff container as claimed in claim 14, wherein said lower part of said liquid container has a substantially cylindrical shape and includes a pleated side wall capable of elastically contracting upon the application of the pressure.

16. A self-heating foodstuff container as claimed in claim 15, further comprising a support member slidably mounted with respect to said body and positioned below said lower part, and wherein an upward movement of said support member relative to said body presses said lower part of contract the same.

17. A self-heating foodstuff container as claimed in claim 14, further comprising a distributing disk disposed in said second chamber in the vicinity of said open end of said liquid container, said distributing disk having a plurality of apertures for diffusing the liquid from said open end.

18. A self-heating foodstuff container as claimed in claim 14, further comprising a supplemental liquid container positioned in said second chamber and formed of a material capable of being melted by heat generated by the exothermic reaction, said supplemental liquid container being arranged at a position spaced from said open end toward the periphery of said second chamber in order to diffuse the liquid.

19. In a self-heating foodstuff container comprising a body including a first chamber for containing a foodstuff and a second chamber for receiving an exothermic reaction agent and a liquid container for supplying liquid to said exothermic reaction agent to thereby cause an exothermic reaction, said liquid container comprising:
a body portion having a pleated wall adapted to contract upon the application thereto of pressure thus reducing the volume of said body portion;
a conduit connected to said body portion and having a funnel-shaped open end; and
a plug fitted in said open end and adapted to be disengaged therefrom by pressure of the liquid when said body portion is contracted, thereby permitting the liquid to discharge from said open end.

20. A liquid container as claimed in claim 19, wherein said plug is made of a material having elasticity and viscosity.

21. A liquid container as claimed in claim 19, wherein said conduit includes formed at a longitudinally intermediate portion thereof an expanded part adapted to be melted by heat generated by the exothermic reaction.

22. A liquid container as claimed in claim 19, further comprising a press rod extending in said body portion and said conduit, and whreein the contraction of said body portion moves said press rod to urge said plug in a direction of disengagement from said open end.

* * * * *

UNITED STATES PATENT AND TRADEMARK OFFICE
CERTIFICATE OF CORRECTION

PATENT NO. : 4,773,389
DATED : September 27, 1988
INVENTOR(S) : Masafumi HAMASAKI It is certified that error appears in the above-identified patent and that said Letters Patent is hereby corrected as shown below:

On the Abstract page, the Foreign Application Priority Data was omitted and should be inserted as follows:

--Feb. 19, 1986 [JP] Japanese Utility Model 61-21563

Feb. 19, 1986 [JP] Japanese Utility Model 61-21564

Feb. 19, 1986 [JP] Japanese Utility Model 61-21565--.

Signed and Sealed this

Twenty-eighth Day of March, 1989

Attest:

DONALD J. QUIGG

*Attesting Officer*  *Commissioner of Patents and Trademarks*